US012722455B2

(12) United States Patent
Shin et al.

(10) Patent No.: US 12,722,455 B2
(45) Date of Patent: Sep. 1, 2026

(54) AIR CONDITIONER SYSTEM FOR ELECTRIC MOTOR VEHICLES

(71) Applicants: HYUNDAI MOTOR COMPANY, Seoul (KR); KIA CORPORATION, Seoul (KR); SEOUL NATIONAL UNIVERSITY R&DB FOUNDATION, Seoul (KR)

(72) Inventors: Gee Young Shin, Suwon-si (KR); Dong Ho Kwon, Yongin-si (KR); Myung Hoe Kim, Seoul (KR); Seung Sik Han, Hwaseong-si (KR); Sun Ik Na, Seoul (KR); Gwi Taek Kim, Seoul (KR); Min Soo Kim, Seoul (KR)

(73) Assignees: HYUNDAI MOTOR COMPANY, Seoul (KR); KIA CORPORATION, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 774 days.

(21) Appl. No.: 17/734,724

(22) Filed: May 2, 2022

(65) Prior Publication Data

US 2023/0022653 A1 Jan. 26, 2023

(30) Foreign Application Priority Data

Jul. 21, 2021 (KR) ........................ 10-2021-0096009

(51) Int. Cl.
*B60H 3/02* (2006.01)
*B60H 1/32* (2006.01)

(52) U.S. Cl.
CPC .......... *B60H 3/024* (2013.01); *B60H 1/3207* (2013.01); *B60H 1/3211* (2013.01); *B60H 2003/028* (2013.01)

(58) Field of Classification Search
CPC ...... B60H 1/3207; B60H 1/3211; B60H 3/02; B60H 3/024; B60H 2003/028
See application file for complete search history.

(56) References Cited

U.S. PATENT DOCUMENTS 5,327,739 A * 7/1994 Ingersoll ................ B60H 3/022 62/93
6,213,198 B1 * 4/2001 Shikata ................ B60H 1/3207 62/3.61

(Continued)

FOREIGN PATENT DOCUMENTS

CN 104129253 A 11/2014
CN 111284315 A 6/2020

(Continued)

OTHER PUBLICATIONS

Office action cited in Chinese application No. 202210550423.5; Apr. 30, 2026; 12 pp.

*Primary Examiner* — Joel M Attey
*Assistant Examiner* — Meraj A Shaikh
(74) *Attorney, Agent, or Firm* — Lempia Summerfield Katz LLC

(57) ABSTRACT

An air conditioner system for electric motor vehicles reduces the thermal load on the air conditioner system during air conditioning using a desiccant-coated heat exchanger and improves energy efficiency thereof using waste heat obtained while cooling electric devices during regeneration of a desiccant-coated heat exchanger.

18 Claims, 14 Drawing Sheets

(56) References Cited

U.S. PATENT DOCUMENTS

| | | | | |
|---|---|---|---|---|
| 9,028,591 | B2 | 5/2015 | Wang et al. | |
| 10,814,692 | B2 | 10/2020 | Kim | |
| 2009/0277202 | A1* | 11/2009 | Viegas | B60H 3/024 62/323.3 |
| 2012/0011870 | A1* | 1/2012 | Viegas | B60H 1/00428 62/236 |
| 2014/0326133 | A1* | 11/2014 | Wang | B60H 3/024 95/126 |
| 2020/0165993 | A1* | 5/2020 | Owatari | F02D 41/062 |
| 2020/0180391 | A1* | 6/2020 | Kim | B60H 1/3223 |

FOREIGN PATENT DOCUMENTS

| | | | |
|---|---|---|---|
| EP | 3409518 | A1 | 12/2018 |
| KR | 20080092527 | A | 10/2008 |

* cited by examiner

AIR CONDITIONER SYSTEM FOR ELECTRIC MOTOR VEHICLES

CROSS-REFERENCE TO RELATED APPLICATION

This application claims priority to and the benefits of Korean Patent Application No. 10-2021-0096009, filed on Jul. 21, 2021, in the Korean Intellectual Property Office, the entire contents of which are incorporated herein by reference.

BACKGROUND

1. Field of the Present Disclosure

The present disclosure relates to an air conditioner system for electric motor vehicles, which reduces the thermal load on the air conditioner system during air conditioning.

2. Description of the Related Art

Recently, electric motor vehicles have become popular in line with implementation of eco-friendly technology and to solve a problem of energy depletion and the like. An electric motor vehicle includes a motor that operates with electricity supplied from a battery and outputs power. Therefore, the electric motor vehicle runs with emission of carbon dioxide, low noise, and higher energy efficiency due to the motor compared to that of an internal combustion engine, thus the electric motor vehicle is considered as an eco-friendly vehicle.

A key technology for realizing such an electric motor vehicle is related to a battery module, and studies on reducing weight, miniaturization, and short charging time of batteries are being actively conducted. The battery module maintains optimal performance and long lifespan only when it is used in an optimal temperature environment. However, heat generated during operation and external temperature change make it difficult to use the battery module in an optimal temperature environment.

In addition, unlike an internal combustion engine which generates waste heat used for interior heating, the electric motor vehicle does not generate waste heat during its operation and thus interior heating of the electric motor vehicle is performed using an electric heating device in winter. Further, warm-up is desired to improve performance of battery charging and discharging in cold weather, so a coolant heating type electric heater is separately used. That is, in order to maintain the optimal temperature environment of the battery module, a technology is employed to separately operate the heating and cooling system for controlling the temperature of the battery module from the heating and cooling system for air conditioning for the interior of the vehicle.

In such an electric motor vehicle, the greater the thermal load on the air conditioner system, the higher the consumption of electric energy, thereby reducing the driving distance. In particular, cooling or dehumidification of the air conditioner system in winter increases energy consumption of the air conditioner system. That is, the cooling load consists of a latent heat load and a sensible heat load, and most of the cooling load is a condensed latent heat load. In addition, in the case of dehumidification in winter, the air is cooled below the dew point for dehumidification to condense vapor, and is then reheated to be provided, which causes energy loss.

The description provided as a background art above is intended to help in understanding the background of the present disclosure, and should not be accepted as acknowledging that the description corresponds to the prior art known to those of ordinary skill in the art.

SUMMARY OF THE PRESENT DISCLOSURE

The present disclosure has been made in order to solve the above-mentioned problems and an aspect of the present disclosure is to provide an air conditioner system for electric motor vehicles, which uses a desiccant-coated heat exchanger to reduce the thermal load on the air conditioner system during air conditioning and uses waste heat obtained by cooling electric devices during regeneration of a desiccant-coated heat exchanger to improve energy efficiency thereof.

In one embodiment of the present disclosure, an air conditioner system for electric motor vehicles may include: a refrigerant line through which a refrigerant circulates, wherein the refrigerant line includes a compressor, a condenser, an expander, and an evaporator; a coolant line through which a coolant circulates, wherein the coolant line includes a dehumidifying heat exchanger configured to remove moisture from conditioning air, a radiator heat exchanger, an electric device, and a switching valve configured to switch the flow direction of the coolant based on whether the dehumidifying heat exchanger performs dehumidification or regeneration; and an air line configured to cause air to selectively pass through the dehumidifying heat exchanger or the evaporator, and configured to cause the air having passed through at least one of the dehumidifying heat exchanger, the condenser, or the evaporator so as to be selectively supplied to an interior.

The air conditioner system may further include: a heat exchanging line through which external air circulates, which includes an external heat exchanger configured to cause the refrigerant of the refrigerant line to exchange heat with the external air, and is connected to the radiator heat exchanger of the coolant line to cause the external air to exchange heat with the coolant of the coolant line.

The expander in the refrigerant line may include: a first expander disposed at an upstream end of the external heat exchanger, and a second expander disposed at a downstream end of the external heat exchanger.

The air line may include: a first line which includes a first blower configured to circulate air and extends to the exterior while passing through the dehumidifying heat exchanger; a second line including a second blower configured to circulate air and a temperature control valve configured to cause the air to selectively pass through the evaporator or the condenser; and a third line branching from the downstream end of the dehumidifying heat exchanger of the first line through a first shunt valve and connected to the upstream end of the evaporator through a second shunt valve.

When interior cooling and dehumidification are desired, the first expander may be opened and the refrigerant may be expanded by the second expander in the refrigerant line, and the coolant may flow through the radiator heat exchanger, the dehumidifying heat exchanger, and the electric device in sequence by the switching valve in the coolant line.

The air circulating through the first line may flow to the second line by a first shunt valve and a second shunt valve, pass through the evaporator together with the air circulating through the second line, and bypass the condenser by the temperature control valve to then be discharged to the interior.

When interior cooling and regeneration of the dehumidifying heat exchanger are desired, the first expander may be opened and the refrigerant may be expanded by the second expander in the refrigerant line, and the coolant may flow through the radiator heat exchanger, the electric device, and the dehumidifying heat exchanger in sequence by the switching valve in the coolant line.

The air circulating through the first line may be discharged to the exterior by the first shunt valve, and the air circulating through the second line may pass through the evaporator by the second shunt valve and bypass the condenser by the temperature control valve to then be discharged to the interior.

The refrigerant line may further include a bypass line that branches between the external heat exchanger and the second expander through a bypass valve and is connected between the evaporator and the compressor.

When interior heating and dehumidification are desired, the first expander may be expanded and the refrigerant may bypass the evaporator by the bypass valve in the refrigerant line, and the coolant may flow through the radiator heat exchanger, the dehumidifying heat exchanger, and the electric device in sequence by the switching valve in the coolant line.

The air circulating through the first line may flow to the second line by the first shunt valve and the second shunt valve and pass through the condenser together with the air circulating through the second line by the temperature control valve to then be discharged to the interior.

When interior heating and regeneration of the dehumidifying heat exchanger are desired, the refrigerant may be expanded by the first expander and bypass the evaporator by the bypass valve in the refrigerant line, and the coolant may flow through the radiator heat exchanger, the electric device, and the dehumidifying heat exchanger in sequence by the switching valve in the coolant line.

The air circulating through the first line may be discharged to the exterior by the first shunt valve, and the air circulating through the second line may pass through the condenser by the second shunt valve and the temperature control valve to then be discharged to the interior.

The first line may include a defrost line that branches from the third shunt valve and extends to the windshield in the interior.

The condenser may be configured as a first condenser and a second condenser, the second line may include a first air conditioning line that passes through the first condenser and extends to a windshield and a second air conditioning line that passes through the second condenser and extends to each interior vent, and the first line may include a third air conditioning line that branches from the third shunt valve and is connected to the upstream end of the first condenser.

The air conditioning line may include a fourth line that includes a single blower configured to circulate air, passes through the dehumidifying heat exchanger to be connected to the upstream end of the evaporator, and has a third shunt valve provided at the downstream end of the dehumidifying heat exchanger, and a fifth line that branches from the fourth line through the fourth shunt valve and includes a temperature control valve configured to cause the air to selectively pass through the evaporator or the condenser.

When interior cooling and dehumidification are desired, the first expander may be opened and the refrigerant may be expanded by the second expander in the refrigerant line, and the coolant may flow through the radiator heat exchanger, the dehumidifying heat exchanger, and the electric device in sequence by the switching valve in the coolant line.

The air circulating through the fourth line by the single blower may pass through the dehumidifying heat exchanger by the third shunt valve and the fourth shunt valve, then pass through the evaporator, and bypass the condenser by the temperature control valve to then be discharged to the interior.

When interior cooling and regeneration of the dehumidifying heat exchanger are desired, the first expander may be opened and the refrigerant may be expanded by the second expander in the refrigerant line, and the coolant may flow through the radiator heat exchanger, the electric device, and the dehumidifying heat exchanger in sequence by the switching valve in the coolant line.

A portion of the air circulating through the fourth line by a single blower may pass through the dehumidifying heat exchanger by the fourth shunt valve and may be discharged to the exterior by the third shunt valve, and the remaining air may pass through the evaporator and bypass the condenser by the temperature control valve to then be discharged to the interior.

The refrigerant line may further include a bypass line that branches between the external heat exchanger and the second expander through a bypass valve and is connected between the evaporator and the compressor.

When interior heating and dehumidification are desired, the refrigerant may be expanded by the first expander and bypass the evaporator by the bypass valve in the refrigerant line, and the coolant may flow through the radiator heat exchanger, the dehumidifying heat exchanger, and the electric device in sequence by the switching valve in the coolant line.

The air circulating through the fourth line by the single blower may pass through the dehumidifying heat exchanger by the third shunt valve and the fourth shunt valve and then pass through the condenser by the temperature control valve to be discharged to the interior.

When interior heating and regeneration of the dehumidifying heat exchanger are desired, the refrigerant may be expanded by the first expander and bypass the evaporator by the bypass valve in the refrigerant line, and the coolant may flow through the radiator heat exchanger, the electric device, and the dehumidifying heat exchanger in sequence by the switching valve in the coolant line.

A portion of the air circulating through the fourth line by the single blower may pass through the dehumidifying heat exchanger by the fourth shunt valve and may be discharged to the exterior by the third shunt valve, and the remaining air may pass through the condenser by the temperature control valve to then be discharged to the interior.

The heat exchanging line may be configured such that the external air passing through the radiator heat exchanger is discharged to the interior or exterior of the electric motor vehicle, and when interior heating and dehumidification are desired and temperature of the coolant and air desired for interior heating is low, the coolant may flow through the radiator heat exchanger, the dehumidifying heat exchanger, and the electric device in sequence by the switching valve in the coolant line. The air circulating through the fourth line by the single blower may pass through the dehumidifying heat exchanger by the third shunt valve and the fourth shunt valve and may be discharged to the interior, and a portion of the external air that has passed through the radiator heat exchanger in the heat exchanging line may be discharged to the interior.

The heat exchanging line may be configured such that the external air passing through the radiator heat exchanger is discharged to the interior or exterior of the electric motor vehicle, and when interior heating and regeneration of the dehumidifying heat exchanger are desired and temperature of the coolant and air desired for interior heating is low, the coolant may flow through the radiator heat exchanger, the electric device, and the dehumidifying heat exchanger in sequence by the switching valve in the coolant line. A portion of the air circulating through the fourth line by the single blower may be discharged to the exterior by the third shunt valve and the remaining air circulating through the fifth line may be discharged to the exterior by the fourth shunt valve. In addition, a portion of the external air that has passed through the radiator heat exchanger in the heat exchanging line may be discharged to the interior.

The air conditioner system for an electric motor vehicle having the structure described above is able to reduce the thermal load on the air conditioner system during air conditioning using a desiccant-coated heat exchanger and to improve energy efficiency using waste heat obtained by cooling electric devices during regeneration of a desiccant-coated heat exchanger.

BRIEF DESCRIPTION OF THE DRAWINGS

The above and other aspects, features, and advantages of the present disclosure should be more apparent from the following detailed description taken in conjunction with the accompanying drawings, in which.

DETAILED DESCRIPTION

Hereinafter, an air conditioner system for an electric motor vehicle according to some embodiments of the present disclosure is described below with reference to the accompanying drawings.

When a component is referred to as being "connected to" or "contacting" another component, it should be understood that the component may be directly connected to or contacting another component, but also that other components may exist in between. On the other hand, when a component is referred to as being "directly connected to" or "in direct contact with" another element, it should be understood that no other component exists therebetween. Other expressions for describing a relationship between components, i.e., "between" and "immediately between" or "adjacent to" and "directly adjacent to" should be interpreted similarly.

When a component, device, element, or the like of the present disclosure is described as having a purpose or performing an operation, function, or the like, the component, device, or element should be considered herein as being "configured to" meet that purpose or to perform that operation or function.

Figure 1:
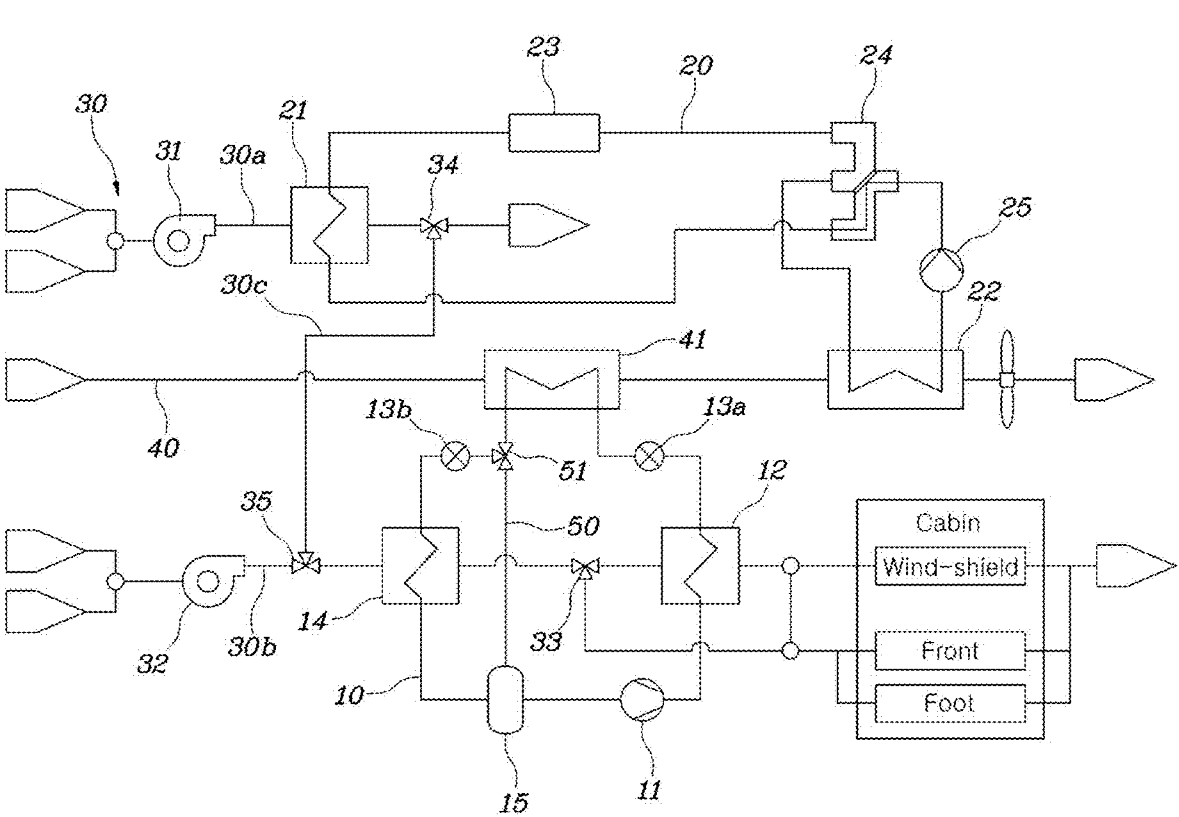
FIG. 1 is a diagram illustrating an air conditioner system for an electric motor vehicle according to one embodiment of the present disclosure.
Figure 2:
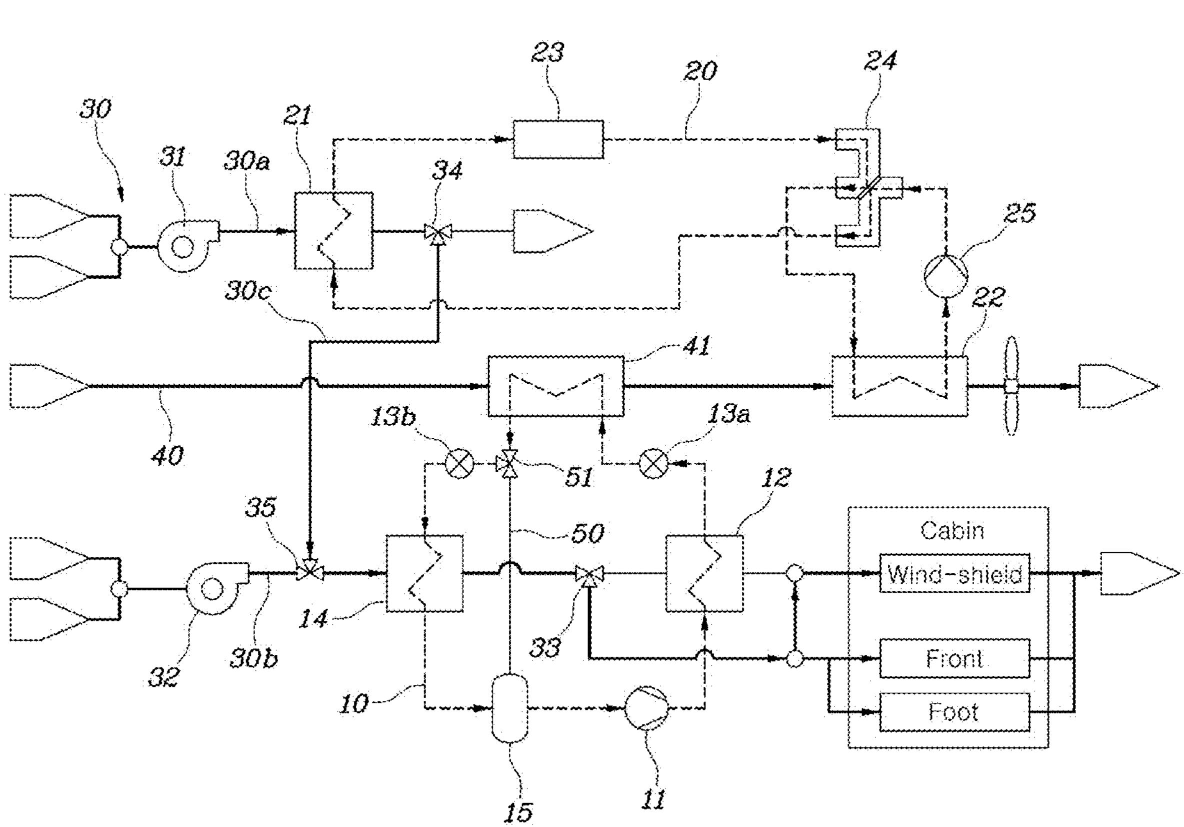
FIG. 2 is a diagram illustrating cooling and dehumidification according to one embodiment of the present disclosure.
Figure 3:
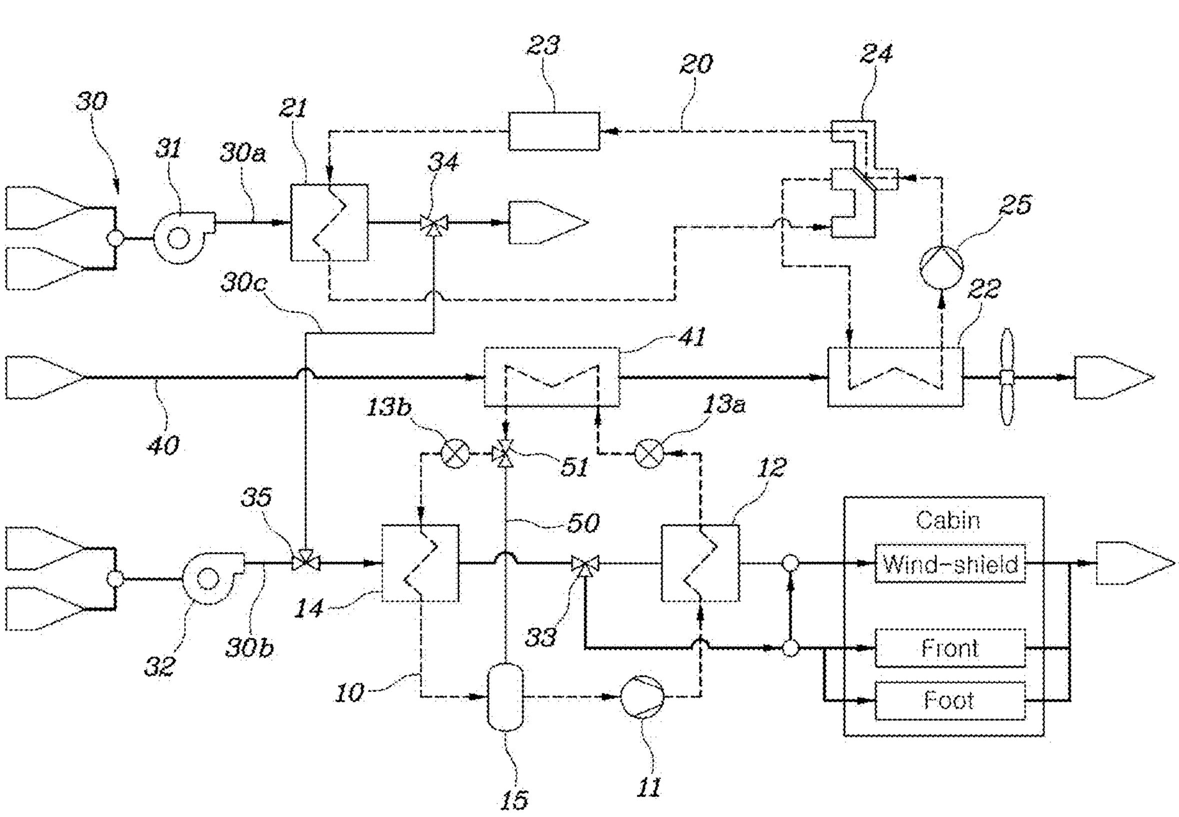
FIG. 3 is a diagram illustrating cooling and regeneration of a dehumidifying heat exchanger according to one embodiment of present disclosure.
Figure 4:
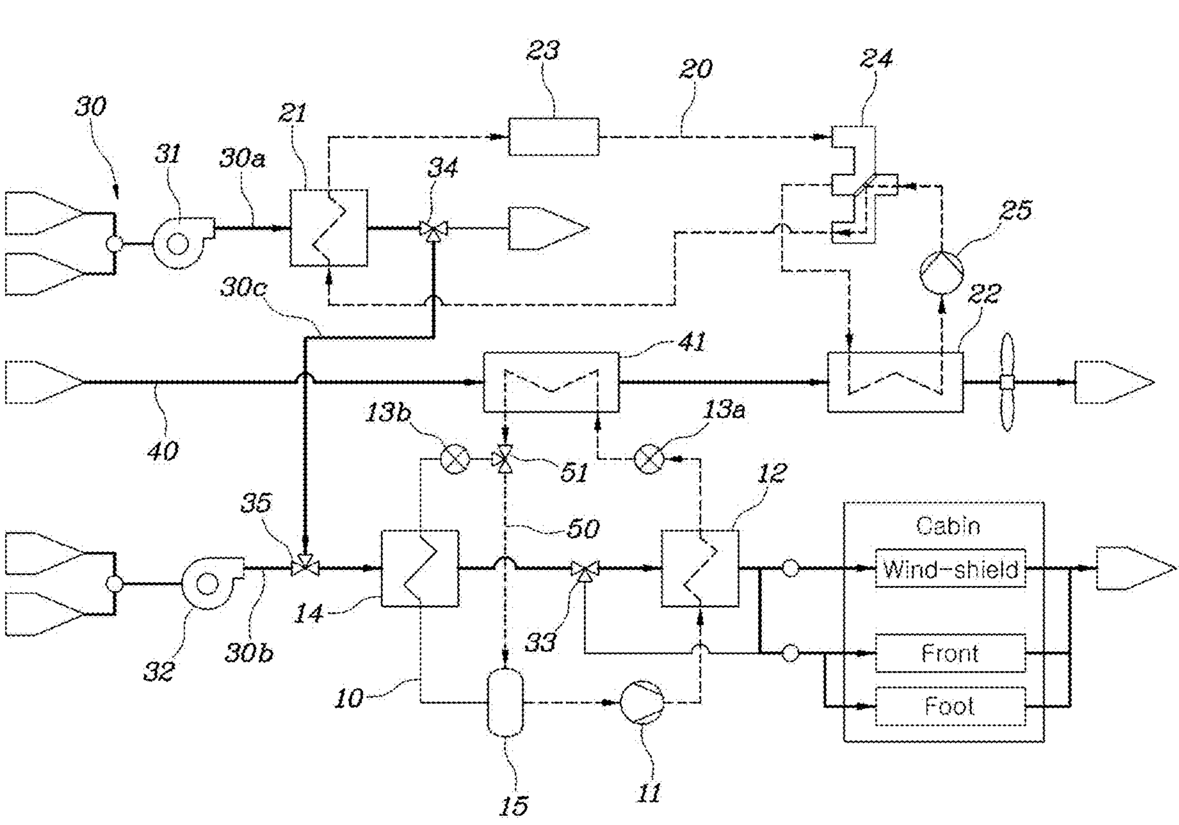
FIG. 4 is a diagram illustrating heating and dehumidification according to one embodiment of the present disclosure.
Figure 5:
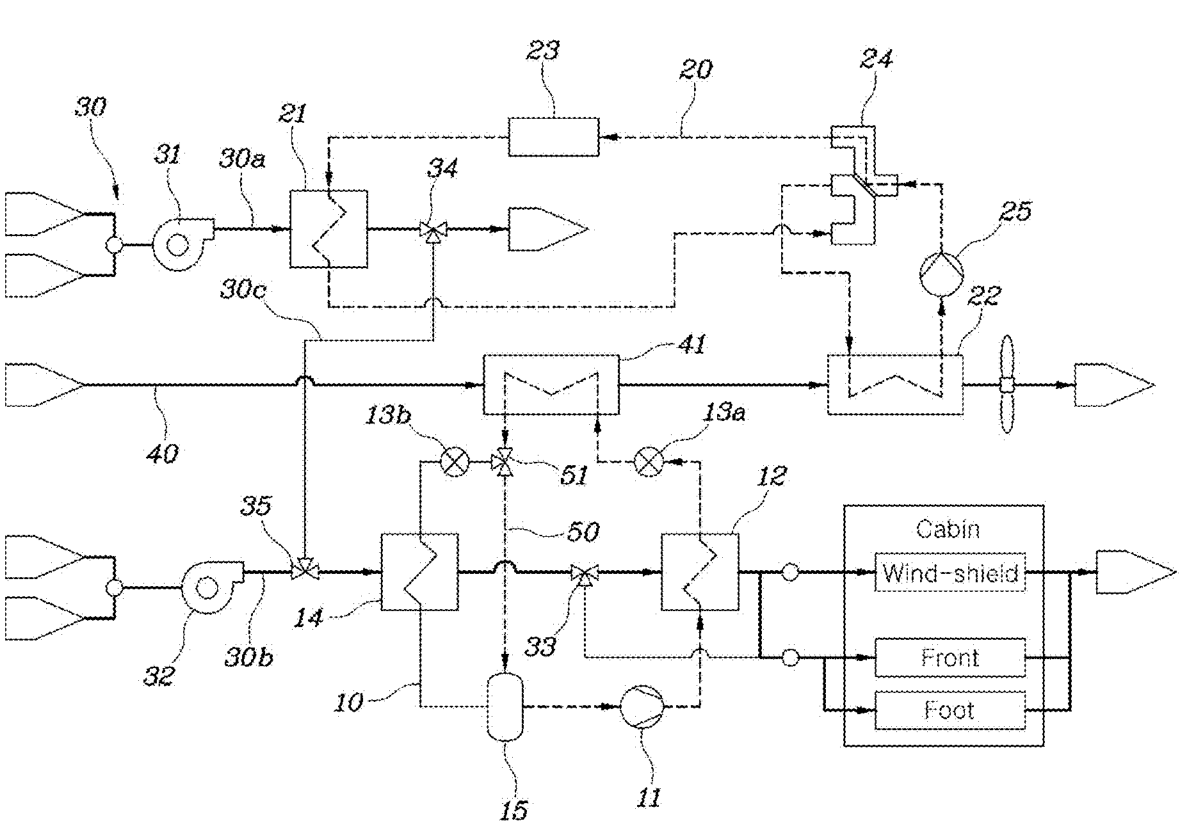
FIG. 5 is a diagram illustrating heating and regeneration of a dehumidifying heat exchanger according to one embodiment of the present disclosure.
Figure 6:
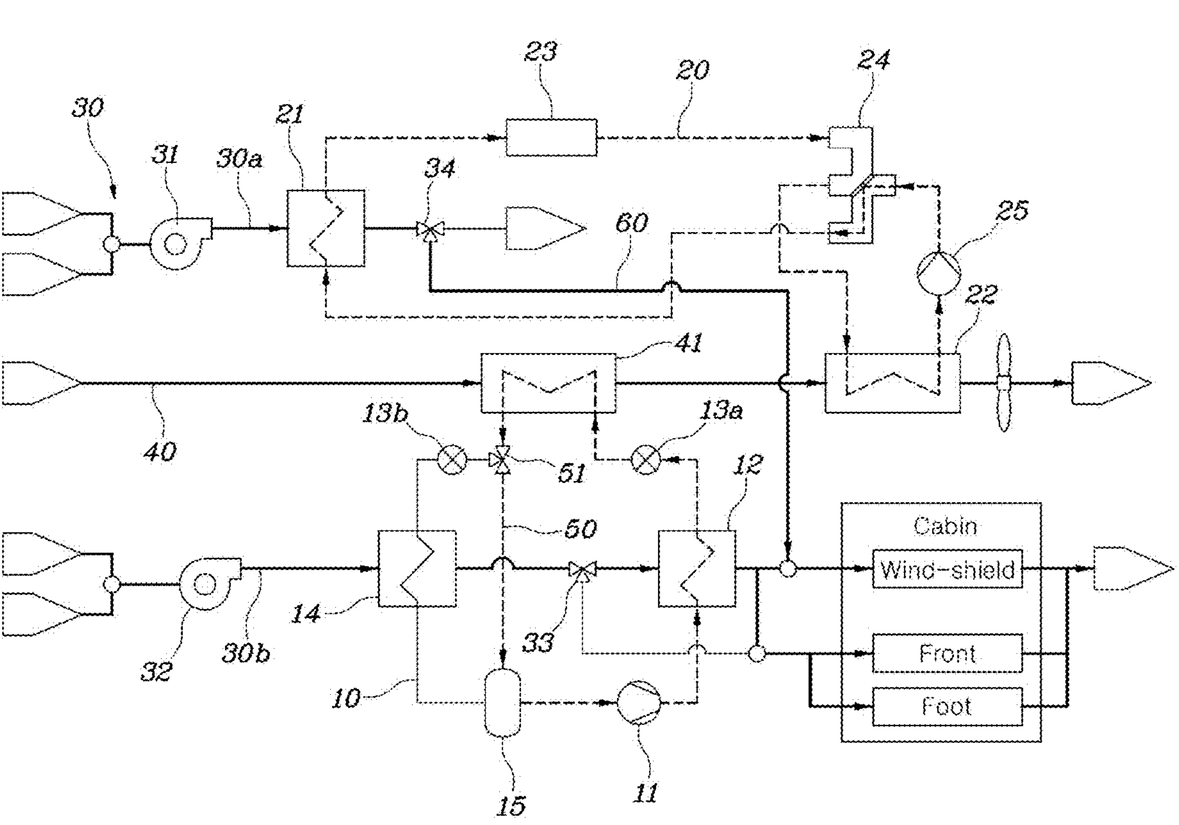
FIG. 6 is a diagram illustrating a defrost mode according to one embodiment of the present disclosure.
Figure 8:
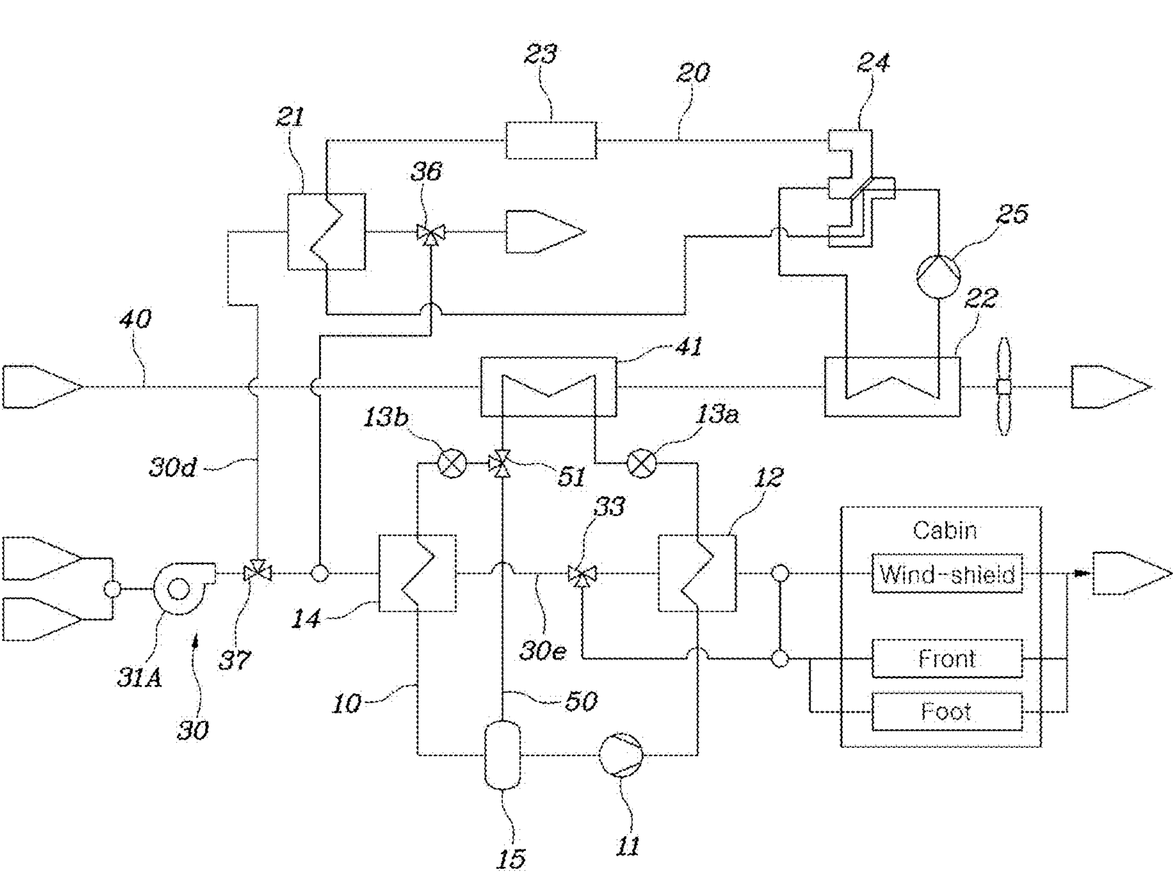
FIG. 8 is a diagram illustrating another embodiment of an air conditioner system for an electric motor vehicle according to one embodiment of the present disclosure.
Figure 9:
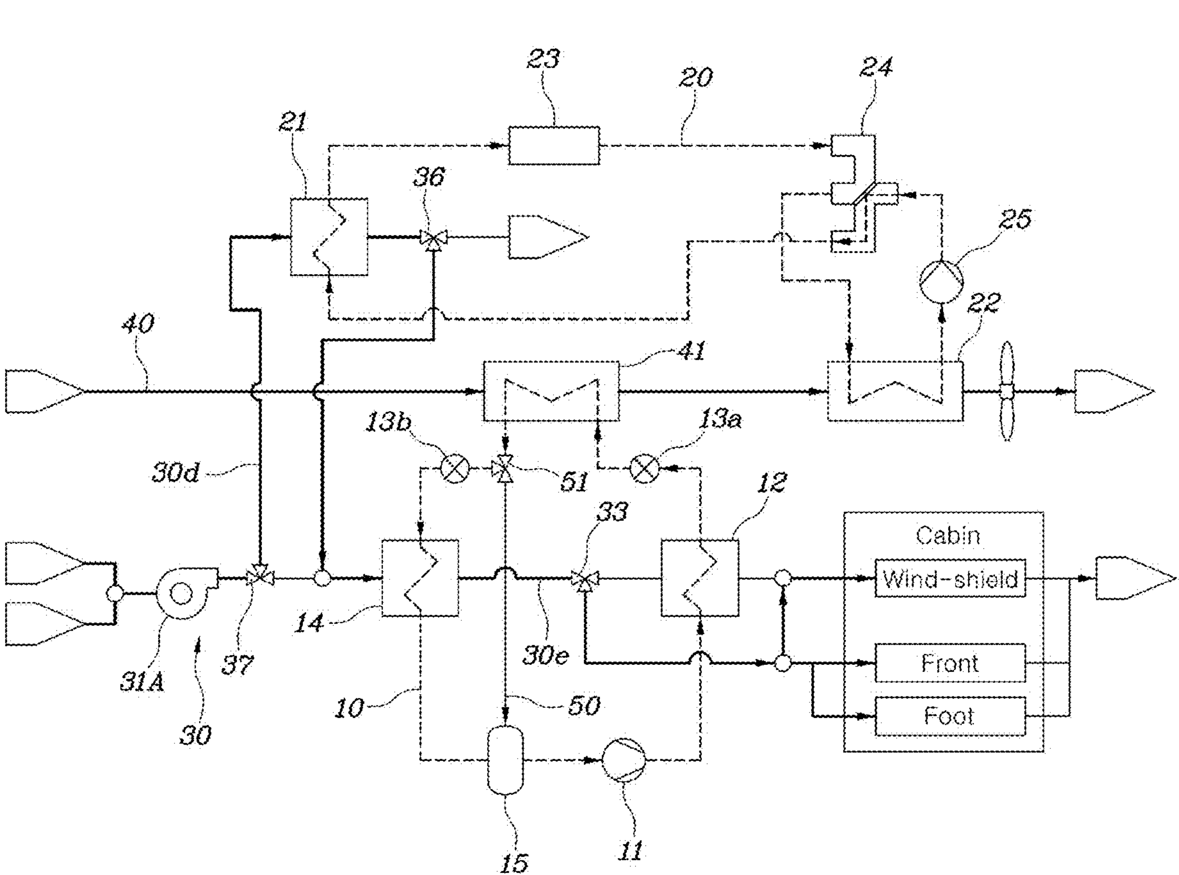
FIG. 9 is a diagram illustrating cooling and dehumidification according to another embodiment.
Figure 10:
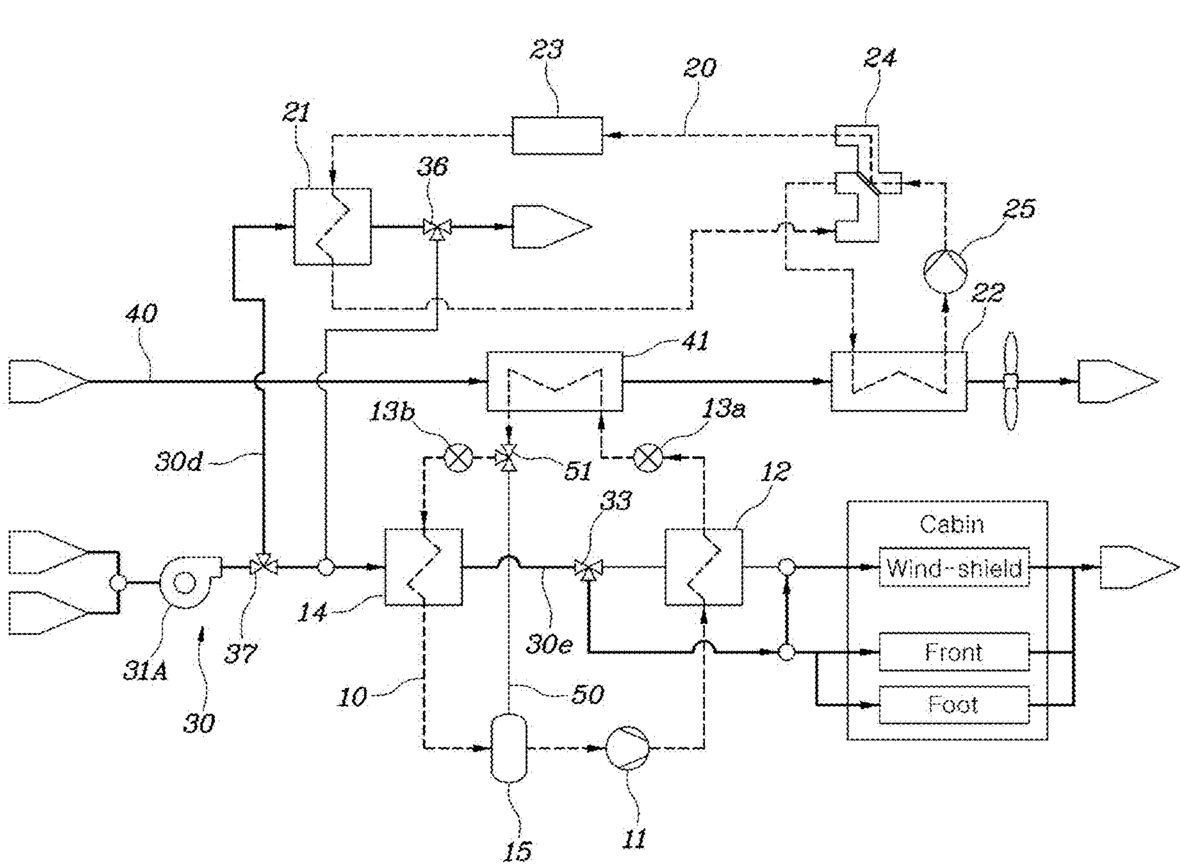
FIG. 10 is a diagram illustrating cooling and regeneration of a dehumidifying heat exchanger according to another embodiment.
Figure 11:
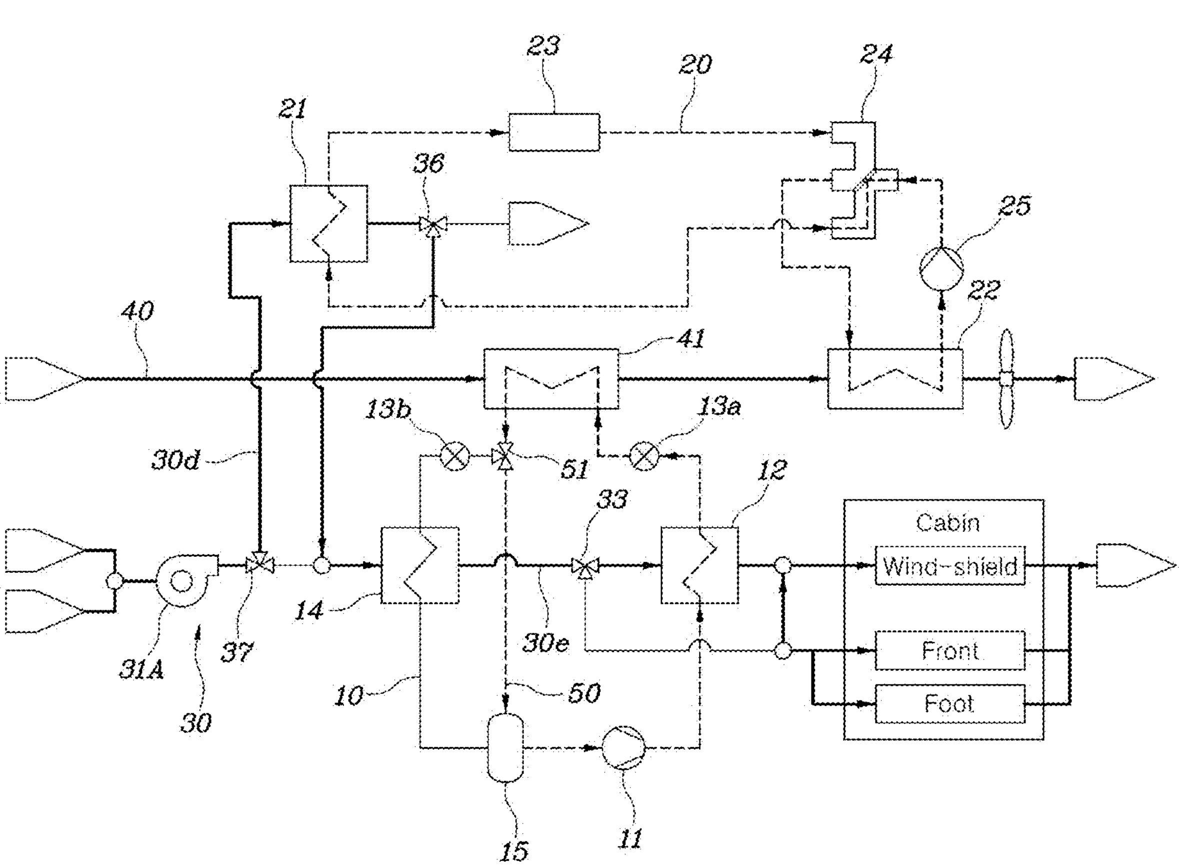
FIG. 11 is a diagram illustrating heating and dehumidification according to another embodiment.
Figure 12:
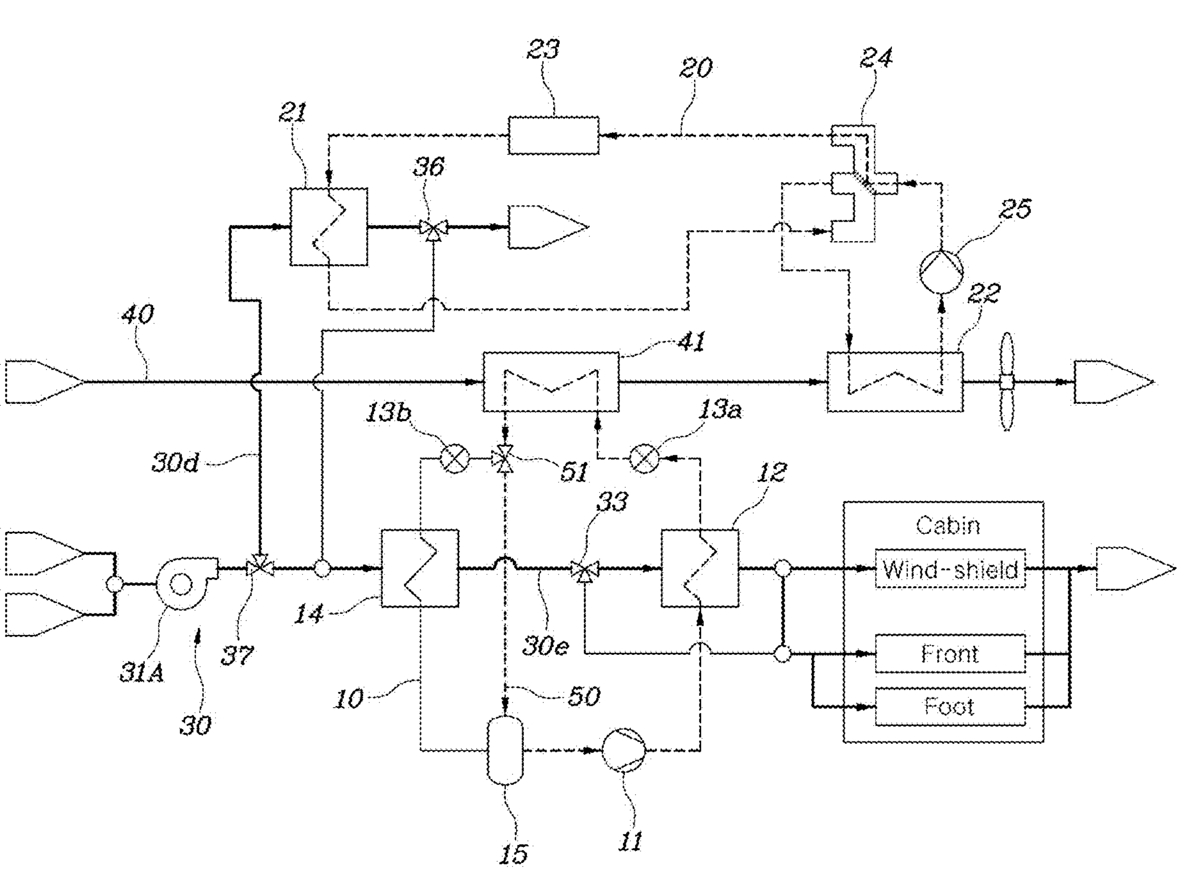
FIG. 12 is a diagram illustrating heating and regeneration of a dehumidifying heat exchanger according to another embodiment.
Figure 13:
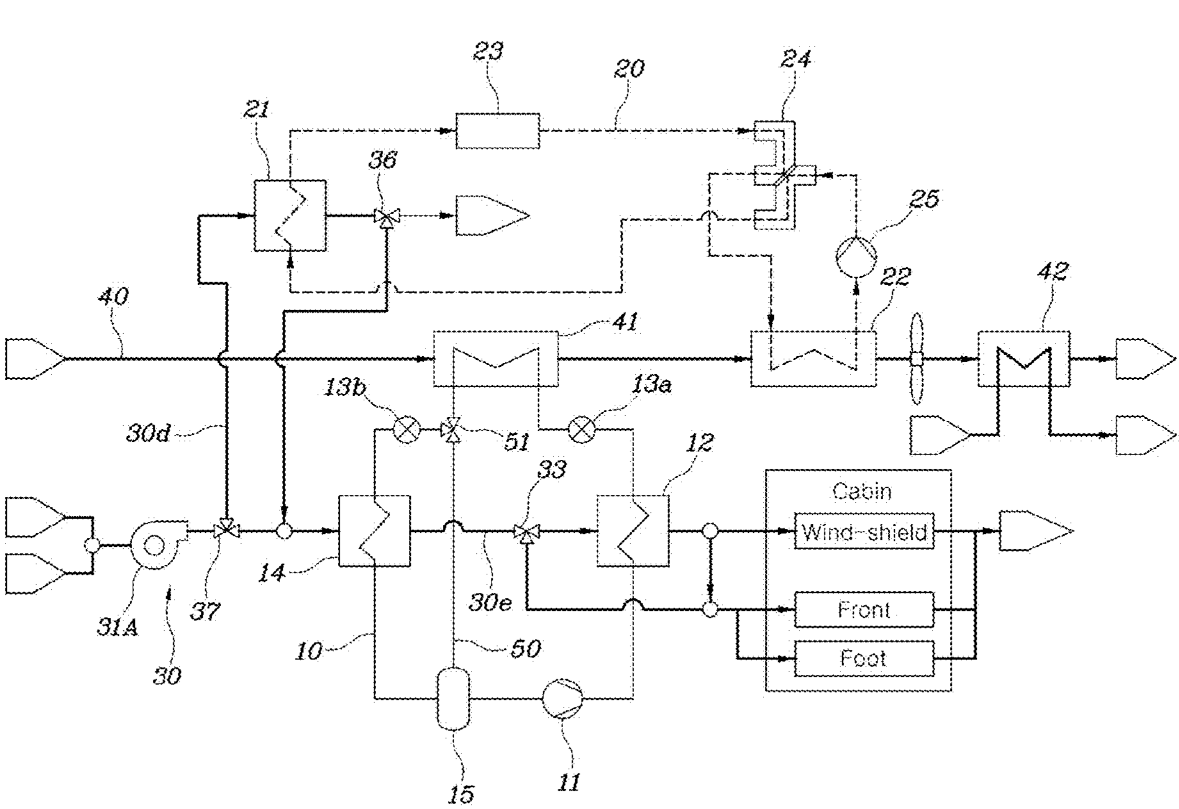
FIG. 13 is a diagram illustrating heating and dehumidification according to another embodiment of the present disclosure.
Figure 14:
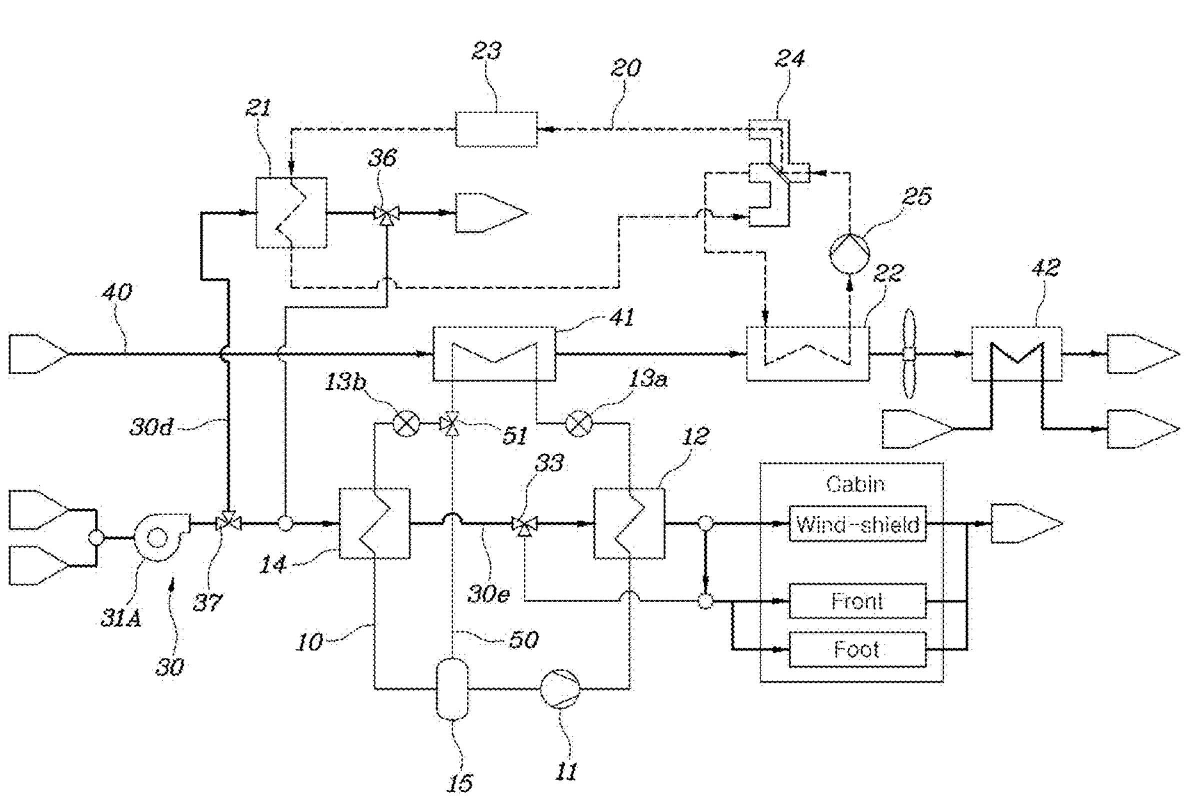
FIG. 14 is a diagram illustrating heating and regeneration of a dehumidifying heat exchanger according to another embodiment of the present disclosure.

FIG. 1 is a diagram illustrating an air conditioner system for an electric motor vehicle according to the present disclosure. FIG. 2 is a diagram illustrating cooling and dehumidification according to the present disclosure. FIG. 3 is a diagram illustrating cooling and regeneration of a dehumidifying heat exchanger according to present disclosure. FIG. 4 is a diagram illustrating heating and dehumidification according to the present disclosure. FIG. 5 is a diagram illustrating heating and regeneration of a dehumidifying heat exchanger according to the present disclosure. FIG. 6 is a diagram illustrating a defrost mode according to the present disclosure. FIG. is a diagram illustrating a defrost mode according to another embodiment of the present disclosure. FIG. 8 is a diagram illustrating another embodiment of an air conditioner system for an electric motor vehicle according to the present disclosure. FIG. 9 is a diagram illustrating cooling and dehumidification according to another embodiment. FIG. 10 is a diagram illustrating cooling and regeneration of a dehumidifying heat exchanger according to another embodiment. FIG. 11 is a diagram illustrating heating and dehumidification according to another embodiment. FIG. 12 is a diagram illustrating heating and regeneration of a dehumidifying heat exchanger according to another embodiment. FIG. 13 is a diagram illustrating heating and dehumidification according to another embodiment of the present disclosure. FIG. 14 is a diagram illustrating heating and regeneration of a dehumidifying heat exchanger according to another embodiment of the present disclosure.

As shown in FIG. 1, an air conditioner system for an electric motor vehicle may include: a refrigerant line 10 through which a refrigerant circulates and having a compressor 11, a condenser 12, an expander 13*a* and/or 13*b*, and an evaporator 14; a coolant line 20 through which a coolant circulates and having a dehumidifying heat exchanger 21 configured to remove moisture from the conditioning air, a radiator heat exchanger 22, an electric device 23, and a switching valve 24 configured to switch the flow direction of the coolant depending on whether the dehumidifying heat exchanger 21 performs dehumidification or regeneration; and an air line 30 configured to cause the air to selectively pass through the dehumidifying heat exchanger 21 or the evaporator 14, and cause the air that has passed through any one or more of the dehumidifying heat exchanger 21, the condenser 12, and the evaporator 14 to be selectively supplied to the interior.

Here, the coolant line 20 may be provided with a pump 25 for circulation of the coolant, and the refrigerant line 10 may be further provided with a gas-liquid separator 15 for effective circulation of the refrigerant and separation of gas and liquid.

In embodiments of the present disclosure, a controller including a processor may control circulation of the refrigerant, circulation of the coolant, and determine whether or not to perform dehumidification or regeneration by the dehumidifying heat exchanger 21, and the like. That is, the controller controls respective elements such as a blower, a valve, the compressor 11, the pump 25, and the like according to the temperature desired for the interior and whether or not to perform dehumidification, thereby providing conditioning air desired for the interior.

The refrigerant line 10 is configured to cool the conditioning air while the refrigerant circulates through the compressor 11, the condenser 12, the expander, and the evaporator 14.

The coolant line 20 performs heat exchange while the coolant circulates through the dehumidifying heat exchanger 21, the radiator heat exchanger 22, and the electric device 23. Here, the dehumidifying heat exchanger 21 may be configured as a desiccant-coated heat exchanger (DCHE) in which a desiccant is coated on the heat exchanger to exchange heat generated during moisture absorption with the coolant, thereby performing dehumidification. In addition, the electric device 23 may be configured as an electric component such as a motor or an on board charger (OBC).

The air line 30 may cause the external or internal air to selectively pass through the dehumidifying heat exchanger 21 or the evaporator 14, and cause the air having passed through any one or more of the dehumidifying heat exchanger 21, the condenser 12, and the evaporator 14 to be selectively supplied to the interior, thereby providing the temperature-controlled air or the dehumidified air to the interior.

In one form of the present disclosure, when the external or internal air passes through the dehumidifying heat exchanger 21 in the air line 30, the air is dehumidified, when the external or internal air passes through the evaporator 14, the air is cooled, and when the external or internal air passes through the condenser 12, the air is heated, thereby providing conditioning air required for the interior.

In addition, in one form of the present disclosure, because the switching valve 24 switches the flow path of the coolant in the coolant line 20, the coolant cooled by the radiator heat exchanger 22 passes through the dehumidifying heat exchanger 21 or the coolant heated by cooling the electric device 23 passes through the dehumidifying heat exchanger 21, thus the dehumidifying heat exchanger 21 performs dehumidification or regeneration.

During the dehumidification by the dehumidifying heat exchanger 21, the coolant cooled by the radiator heat exchanger 22 may pass through the dehumidifying heat exchanger 21, and the dehumidifying heat exchanger 21 may remove moisture by heat exchange between the coolant and the air passing through the air line 30.

In addition, during the regeneration by the dehumidifying heat exchanger 21, the coolant heated during cooling the electric device 23 passes through the dehumidifying heat exchanger 21, and thus the dehumidifying heat exchanger 21 performs regeneration by the heat of the coolant.

At this time, the air line 30 causes the dry air dehumidified by the dehumidifying heat exchanger 21 to be provided to the interior, and causes the highly humid air produced during the regeneration of the dehumidifying heat exchanger 21 to be discharged to the exterior.

According to this, the present disclosure can provide conditioning air required for the interior by selectively providing the interior with the dehumidified dry air, the cooling air passing through the evaporator 14, or the heating air passing through the condenser 12, and improve energy efficiency by performing regeneration of the dehumidifying heat exchanger 21 using the heat generated by cooling the electric device 23.

On the other hand, the present disclosure may further include a heat exchanging line 40 through which the external air circulates, including an external heat exchanger 41 to cause heat exchange between the refrigerant of the refrigerant line 10 and the external air, and connected to the radiator heat exchanger 22 of the coolant line 20 to cause heat exchange between the external air and the coolant of the coolant line 20.

That is, in the heat exchanging line 40, the external air passes through the external heat exchanger 41 and the radiator heat exchanger 22 so that the external air exchanges heat with the refrigerant through the external heat exchanger 41 and so that the external air exchanges heat with the coolant through the radiator heat exchanger 22.

In addition, the expander in the refrigerant line 10 may include a first expander **13*a* disposed at the upstream end of the external heat exchanger 41 and a second expander 13*b* disposed at the downstream end of the external heat exchanger 41**.

As described above, since the expander includes the first expander **13*a* and the second expander 13*b* respectively disposed at the upstream and downstream ends of the external heat exchanger 41, it is possible to improve air conditioning efficiency through formation of cooling air or heat pumping using the refrigerant in the refrigerant line 10 depending on operation of the first expander 13*a* and the second expander 13*b***.

For example, in the case where cooling air is to be produced, the first expander **13*a* is opened and the second expander 13*b* expands the refrigerant. Therefore, the refrigerant that has passed through the compressor 11 is cooled through heat exchange in the external heat exchanger 41, as well as in the condenser 12, so cooling performance is improved by heat exchange between the refrigerant and the air in the evaporator 14 after passing through the second expander 13*b***.

In addition, in the case where heating air is to be produced, the first expander **13*a* expands the refrigerant and the second expander 13*b* is opened. Therefore, since the external heat exchanger 41 takes over the role of the evaporator 14, cooling air is not produced through the evaporator 14**, so heating efficiency can be secured.

Meanwhile, various embodiments of the present disclosure may be applied depending on the number of blowers to circulate internal or external air through the air line 30.

As an embodiment, as shown in FIG. 1, the air line 30 includes: a first line **30*a* including a first blower 31 for circulating air and extending to the exterior while passing through the dehumidifying heat exchanger 21; a second line 30*b* including a second blower 32 for circulating air and a temperature control valve 33 for selectively passing the air through the evaporator 14 or the condenser 12; and a third line 30*c* that branches from the downstream end of the dehumidifying heat exchanger 21 through the first shunt valve 34 in the first line 30***a* and is connected to the upstream end of the evaporator 14 through the second shunt valve 35.

As described above, the air line 30 includes the first line 30*a*, the second line 30*b*, and the third line 30*c*, the first line 30*a* is provided with the first blower 31 so as to perform production of dry air by the dehumidifying heat exchanger 21 or regeneration of the dehumidifying heat exchanger 21, and the second line 30*b* is provided with the second blower 32 so that the air selectively passes through the evaporator 14 or the condenser 12 by the temperature control valve 33 to then be provided as conditioning air to the interior. The third line 30*c* is intended to selectively pass the dry air produced in the first line 30*a* to the second line 30*b* through the first shunt valve 34 and the second shunt valve 35.

Through this, the present disclosure can provide the air required for the interior.

That is, when interior cooling and dehumidification are desired, the first expander 13*a* is opened and the refrigerant is expanded by the second expander 13*b* in the refrigerant line 10, and the coolant is to flow through the radiator heat exchanger 22, the dehumidifying heat exchanger 21, and the electric device 23 in sequence by the switching valve 24 in the coolant line 20.

In addition, the air circulating through the first line 30*a* flows to the second line 30*b* by the first shunt valve 34 and the second shunt valve 35, passes through the evaporator 14 together with the air circulating through the second line 30*b*, and bypasses the condenser 12 by the temperature control valve 33 to then be discharged to the interior.

Specifically, as shown in FIG. 2, in order to provide cooling air to the interior, the first expander 13*a* is opened, and the refrigerant is expanded by the second expander 13*b* so that the air passing through the evaporator 14 of the refrigerant line 10 is cooled to produce cooling air.

In addition, in the coolant line 20, as the coolant flows through the radiator heat exchanger 22, the dehumidifying heat exchanger 21, and the electric device 23 in sequence by the switching valve 24, the coolant cooled by the radiator heat exchanger 22 passes through the dehumidifying heat exchanger 21 so that moisture in the air passing through the dehumidifying heat exchanger 21 is removed, thereby producing dry air.

Accordingly, the air circulating through the first line 30*a* flows to the second line 30*b* by the first shunt valve 34 and the second shunt valve 35 after passing through the dehumidifying heat exchanger 21, and passes through the evaporator 14 together with the air circulating through the second line 30*b* to then be cooled. The cooling air may bypass the condenser 12 by the temperature control valve 33 in the second line 30*b*, and may be discharged to the interior, thereby providing dehumidified cooling air to the interior.

Meanwhile, when interior cooling and regeneration of the dehumidifying heat exchanger 21 are desired, the first expander 13*a* is opened and the refrigerant is expanded by the second expander 13*b* in the refrigerant line, and the coolant is to flow through the radiator heat exchanger 22, the electric device 23, and the dehumidifying heat exchanger 21 in sequence by the switching valve 24 in the coolant line 20.

In addition, the air circulating through the first line 30*a* is discharged to the exterior by the first shunt valve 34, the air circulating through the second line 30*b* passes to the evaporator 14 by the second shunt valve 35 and bypasses the condenser 12 by the temperature control valve 33 to be discharged to the interior.

In one form, as shown in FIG. 3, in order to provide cooling air to the interior, the first expander 13*a* is opened, and the refrigerant is expanded by the second expander 13*b*, so that the air passing through the evaporator 14 of the refrigerant line 10 is cooled, thereby producing cooling air.

In addition, in the coolant line 20, as the coolant flows through the radiator heat exchanger 22, the electric device 23, and the dehumidifying heat exchanger 21 in sequence by the switching valve 24, the coolant heated by cooling the electric device 23 flows to the dehumidifying heat exchanger 21 so that the dehumidifying heat exchanger 21 performs regeneration using the heat of the coolant.

At this time, as the air passes through the dehumidifying heat exchanger 21 in the first line 30*a*, the air containing moisture may be discharged to the exterior by the first shunt valve 34, and the air circulating through the second line 30*b* may pass through the evaporator 14 by the second shunt valve 35 to be cooled, and bypass the condenser 12 by the temperature control valve 33 to then be discharged to the interior, thereby providing cooling air to the interior.

Meanwhile, in order to provide heating air to the interior, the refrigerant line 10 further has a bypass line 50 that branches between the external heat exchanger 41 and the second expander 13*b* through a bypass valve 51, and is connected between the evaporator 14 and the compressor 11.

The bypass line 50 may have one end connected between the external heat exchanger 41 and the second expander 13*b*, and the other end connected to the gas-liquid separator 15.

With this arrangement, the refrigerant circulating through the refrigerant line 10 may bypass the evaporator 14 to the bypass line 50 depending on whether the bypass valve 51 is opened or closed, thereby producing a refrigerant flow circulating through the compressor 11, the condenser 12, the external heat exchanger 41, and the expander. Thus, the external heat exchanger 41 takes over the role of the evaporator 14, instead of producing cooling air through the evaporator 14, so the heating air that has passed through the condenser 12 may be provided to the interior.

Therefore, when interior heating and dehumidification are required in the present disclosure, the refrigerant is expanded by the first expander 13*a* and bypasses the evaporator 14 by the bypass valve 51 in the refrigerant line 10, and the coolant is to flow through the radiator heat exchanger 22, the dehumidifying heat exchanger 21, and the electric device 23 in sequence by the switching valve 24 in the coolant line 20.

In addition, the air circulating through the first line 30*a* flows to the second line 30*b* by the first shunt valve 34 and the second shunt valve 35, and passes through the condenser 12 together with the air circulating through the second line 30*b* by the temperature control valve 33 to then be discharged to the interior.

In another form, as shown in FIG. 4, in order to provide heating air to the interior, the refrigerant is expanded by the first expander 13*a* and bypasses the evaporator 14 by the bypass valve 51 so that the external heat exchanger 41 takes over the role of the evaporator 14 and so that heating air is produced through the condenser 12.

In addition, because the coolant flows through the radiator heat exchanger 22, the dehumidifying heat exchanger 21, and the electric device 23 in sequence by the switching valve 24 in the coolant line 20, the coolant cooled by the radiator heat exchanger 22 passes through the dehumidifying heat exchanger 21, and the moisture in the air passing through the dehumidifying heat exchanger 21 is removed to produce dry air.

With this configuration, the air circulating through the first line 30*a* flows to the second line 30*b* by the first shunt valve 34 and the second shunt valve 35 after passing through the dehumidifying heat exchanger 21. The dry air passes through the condenser 12 by the temperature control valve 33 in the second line 30*b* and is then discharged to the interior, thereby providing the dehumidified heating air to the interior.

Meanwhile, in the case where interior heating and regeneration of the dehumidifying heat exchanger 21 are desired, the refrigerant is expanded by the first expander 13*a* and bypasses the evaporator 14 by the bypass valve 51 in the refrigerant line 10, and the coolant is to flow through the radiator heat exchanger 22, the electric device 23, and the dehumidifying heat exchanger 21 in sequence by the switching valve 24 in the coolant line 20.

In addition, the air circulating through the first line 30*a* is discharged to the exterior by the first shunt valve 34, and the air circulating through the second line 30*b* passes through the condenser 12 by the second shunt valve 35 and the temperature control valve 33 to then be discharged to the interior.

In one form, as shown in FIG. 5, in order to provide heating air to the interior, the refrigerant is expanded by the first expander 13*a*, and bypasses the evaporator 14 by the bypass valve 51 so that the external heat exchanger 41 takes over the role of the evaporator 14, thereby producing heating air through the condenser 12.

In addition, in the coolant line 20, since the coolant flows through the radiator heat exchanger 22, the electric device 23, and the dehumidifying heat exchanger 21 in sequence by the switching valve 24, the coolant heated by cooling the electric device 23 is supplied to the dehumidifying heat exchanger 21 so that the dehumidifying heat exchanger 21 performs regeneration by the heat of the coolant.

At this time, as the air passes through the dehumidifying heat exchanger 21 in the first line 30*a*, the air containing moisture may be discharged to the exterior by the first shunt valve 34, and the air circulating through the second line 30*b* may flow to the evaporator 14 and the condenser 12 by the second shunt valve 35, pass through the condenser 12 by the temperature control valve 33 to then be discharged to the interior, thereby providing heating air to the interior.

Meanwhile, in another embodiment, as shown in FIG. 6, the first line 30*a* may be provided with a defrost line 60 that branches from a third shunt valve 34 and extends to the windshield in the interior.

The air is to be supplied to the windshield, as well as to the air vents for respective seats. This is intended to remove the frost from the windshield by supplying dry air thereto.

That is, when it is desired to remove the frost from the windshield, the coolant is to flow through the radiator heat exchanger 22, the dehumidifying heat exchanger 21, and the electric device 23 in sequence by the switching valve 24 in the coolant line 20. Accordingly, the air passing through the dehumidifying heat exchanger 21 is dehumidified, and the dry air that has passed through the dehumidifying heat exchanger 21 in the first line 30*a* is supplied to the defrost line 60 by the third shunt valve 34 to be blown to the windshield.

Therefore, a defrost mode may be implemented according to the present disclosure.

Figure 7:
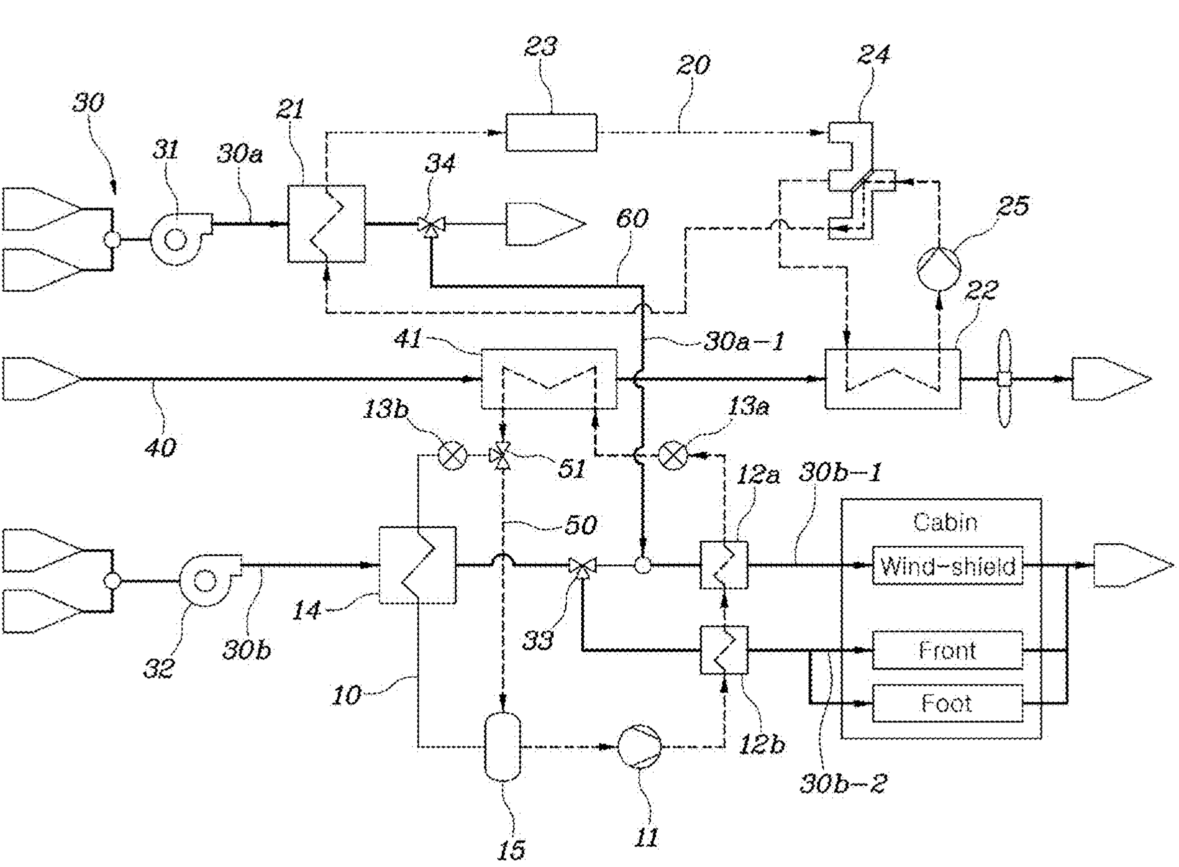
FIG. 7 is a diagram illustrating a defrost mode according to another embodiment of the present disclosure.

Meanwhile, as another embodiment of the defrost mode, as shown in FIG. 7, the condenser 12 may be configured as a first condenser 12*a* and a second condenser 12*b*, and the second line 30*b* may include a first air conditioning line 30*b*-1 passing through the first condenser 12*a* and extending to the windshield, and a second air conditioning line 30*b*-2 passing through the second condenser 12*b* and extending to each interior air vent, and the first line 30*a* may include a third air conditioning line 30*a*-1 that branches from the third shunt valve 36 and is connected to the upstream end of the first condenser 12*a*.

Here, the first condenser 12*a* and the second condenser 12*b* may be configured separately, and may be configured by dividing one condenser 12 using a diaphragm.

Because the first condenser 12*a* and the second condenser 12*b* are separated as described above, it is possible to efficiently manage the heating air supplied to the windshield and the vents for the respective seats in the interior. That is, the first condenser 12*a* and the second condenser 12*b* may be configured to have different heat capacities, thereby efficiently providing conditioning air to the respective vents as well as the windshield.

Therefore, the second line 30*b* is divided into the first air conditioning line 30*b*-1 passing through the first condenser 12*a* and extending to the windshield, and the second air conditioning line 30*b*-passing through the second condenser 12*b* and extending to the respective interior air vents.

In addition, the first line 30*a* may have the third air conditioning line 30*a*-1 that branches from the third shunt valve 36 and is connected to the upstream end of the first condenser 12*a*.

When it is desired to remove the frost from the windshield, the coolant is to flow through the radiator heat exchanger 22, the dehumidifying heat exchanger 21, and electric device 23 in sequence by the switching valve 24 in the coolant line 20. Therefore, the air passing through the dehumidifying heat exchanger 21 is dehumidified, and the dry air passing through the dehumidifying heat exchanger 21 in the first line 30*a* flows from the third air conditioning line 30*a*-1 to the first air conditioning line 30*b*-1 by the third shunt valve 36. Accordingly, the dry air is heated to high temperature by the first condenser 12*a*, and removes the frost from the windshield as dried heating air.

Meanwhile, the air flowing to the second air conditioning line 30*b*-2 of the second line 30*b* passes through the second condenser 12*b* so that heating air may be provided to the respective interior vents, excluding the windshield.

Meanwhile, the present disclosure can perform cooling, heating, and dehumidification or regeneration of the dehumidifying heat exchanger 21 using a single blower 31A.

That is, as shown in FIG. 8, the air conditioning line may be configured as a fourth line 30*d* that includes a single blower 31A for circulating air, passes through the dehumidifying heat exchanger 21 to be connected to the upstream end of the evaporator 14, and has a third shunt valve 36 provided at the downstream end of the dehumidifying heat exchanger 21, and a fifth line 30*e* that branches from the fourth line 30*d* through the fourth shunt valve 37 and includes a temperature control valve 33 to cause the air to selectively pass through the evaporator 14 or the condenser 12.

In the case where the single blower 31A is provided as described above, the air conditioning line may include the fourth line 30*d* and the fifth line 30*e*. Here, the fourth line 30*d* is provided with the single blower 31A, performs production of dry air through the dehumidifying heat exchanger 21 or regeneration of the dehumidifying heat exchanger 21, and causes the dry air that has passed through the dehumidifying heat exchanger 21 to flow to the fifth line 30*e* or to the exterior by the third shunt valve 36.

The fifth line 30*e* branches from the fourth line 30*d* through the fourth shunt valve 37 and causes the air to selectively pass through the evaporator 14 or the condenser 12 by the temperature control valve 33, thereby providing conditioning air to the interior. Thus, the present disclosure can provide the air required for the interior.

When interior cooling and dehumidification are desired, the first expander 13*a* is opened and the refrigerant is expanded by the second expander 13*b* in the refrigerant line 10, and the coolant is to flow through the radiator heat exchanger 22, the dehumidifying heat exchanger 21, and the electric device 23 in sequence by the switching valve 24 in the coolant line 20.

In addition, the air circulating through the fourth line 30*d* by the single blower 31A passes through the dehumidifying heat exchanger 21 by the third shunt valve 36 and the fourth shunt valve 37, then passes the evaporator 14, and bypasses the condenser 12 by the temperature control valve 33 to then be discharged to the interior.

In one form, as shown in FIG. 9, in order to provide cooling air to the interior, the first expander 13*a* is opened, and the refrigerant is expanded by the second expander 13*b*, so that the air passing through the evaporator 14 of the refrigerant line 10 is cooled to produce cooling air.

In addition, since the coolant flows through the radiator heat exchanger 22, the dehumidifying heat exchanger 21, and the electric device 23 in sequence by the switching valve 24 in the coolant line 20, the coolant cooled by the radiator heat exchanger 22 flows to the dehumidifying heat exchanger 21 so that the moisture in the air passing through the dehumidifying heat exchanger 21 is removed to produce dry air.

According to this, the air circulating through the fourth line 30*d* by the single blower 31A may pass through the dehumidifying heat exchanger 21 by the third shunt valve 36 and the fourth shunt valve 37, then flow to the fifth line 30*e*, and bypass the condenser 12 by the temperature control valve 33 in the fifth line 30*e* to then be discharged into the interior, thereby providing the dehumidified cooling air to the interior.

Meanwhile, when interior cooling and regeneration of the dehumidifying heat exchanger 21 are desired, the first expander 13*a* is opened and the refrigerant is expanded by the second expander 13*b* in the refrigerant line 10, and the coolant is to flow through the radiator heat exchanger 22, the electric device 23, and the dehumidifying heat exchanger 21 in sequence by the switching valve 24 in the coolant line 20.

In addition, a portion of the air circulating through the fourth line 30*d* by the single blower 31A passes through the dehumidifying heat exchanger 21 by the fourth shunt valve 37 and is discharged to the exterior by the third shunt valve 36, and the remaining air passes through the evaporator 14 and bypasses the condenser 12 by the temperature control valve 33 to be discharged to the interior.

In one form, as shown in FIG. 10, in order to provide cooling air to the interior, the first expander 13*a* is opened, and refrigerant is expanded by the second expander 13*b*, so that the air passing through the evaporator 14 of the refrigerant line 10 is cooled to produce cooling air.

In addition, as the coolant flows through the radiator heat exchanger 22, the electric device 23, and the dehumidifying heat exchanger 21 in sequence by the switching valve 24 in the coolant line 20, the coolant heated by cooling the electric device 23 passes through the dehumidifying heat exchanger 21, thereby performing regeneration of the dehumidifying heat exchanger 21 by the heat of the coolant.

At this time, as the air passes through the dehumidifying heat exchanger 21 in the fourth line 30*d*, the air containing moisture is discharged to the exterior by the third shunt valve 36, and some air passes through the evaporator 14 by the fourth shunt valve 37 to be cooled and bypasses the condenser 12 by the temperature control valve 33 to then be discharged to the interior, thereby providing cooling air to the interior.

Meanwhile, as shown in FIG. 8, the refrigerant line 10 may further have a bypass line 50 that branches between the external heat exchanger 41 and the second expander 13*b* through the bypass valve 51 and is connected between the evaporator 14 and the compressor 11.

Accordingly, the refrigerant circulating through the refrigerant line 10 may bypass the evaporator 14 to the bypass line 50 depending on whether the bypass valve 51 is opened or closed, thereby producing a refrigerant flow circulating through the compressor 11, the condenser 12, the external heat exchanger 41, and the expander. Thus, the external heat exchanger 41 takes over the role of the evaporator 14, instead of producing cooling air through the evaporator 14, so the heating air that has passed through the condenser 12 may be provided to the interior.

Accordingly, in the case where interior heating and dehumidification are desired in the present disclosure, the refrigerant is expanded by the first expander 13*a* and bypasses the evaporator 14 by the bypass valve 51 in the refrigerant line 10, and the coolant is to flow through the radiator heat exchanger 22, the dehumidifying heat exchanger 21, and the electric device 23 in sequence by the switching valve 24 in the coolant line 20.

In addition, the air circulating through the fourth line 30*d* by the single blower 31A passes through the dehumidifying heat exchanger 21 by the third shunt valve 36 and the fourth shunt valve 37, and passes through the condenser 12 by the temperature control valve 33 to then be discharged to the interior.

In one form, as shown in FIG. 11, in order to provide heating air to the interior, the refrigerant is expanded by the first expander 13*a*, and bypasses the evaporator 14 by the bypass valve 51 so that the external heat exchanger 41 takes over the role of the evaporator 14, thereby producing heating air through the condenser 12.

In addition, since the coolant flows through the radiator heat exchanger 22, the dehumidifying heat exchanger 21, and the electric device 23 in sequence by the switching valve 24 in the coolant line 20, the coolant cooled by the radiator heat exchanger 22 is supplied to the dehumidifying heat exchanger 21 so that the moisture in the air passing through the dehumidifying heat exchanger 21 is removed to produce dry air.

According to this, the air circulating through the fourth line 30*d* by the single blower 31A passes through the dehumidifying heat exchanger 21 by the third shunt valve 36 and the fourth shunt valve 37 to flow to the fifth line 30*e*. The dry air passes through the condenser 12 by the temperature control valve 33 in the fifth line 30*e* and is then discharged to the interior, thereby providing dehumidified heating air to the interior.

Meanwhile, in the case where interior heating and regeneration of the dehumidifying heat exchanger 21 are desired, the refrigerant is expanded by the first expander 13*a* and bypasses the evaporator 14 by the bypass valve 51 in the refrigerant line 10, and the coolant is to flow through the radiator heat exchanger 22, the electric device 23, and the dehumidifying heat exchanger 21 in sequence by the switching valve 24 in the coolant line 20.

In addition, a portion of the air introduced to the fourth line 30*d* by the single blower 31A passes through the dehumidifying heat exchanger 21 by the fourth shunt valve 37 and is discharged to the exterior by the third shunt valve

36, and the remaining air passes through the condenser 12 by the temperature control valve 33 to be discharged to the interior.

In one form, as shown in FIG. 12, in order to provide heating air to the interior, the refrigerant is expanded by the first expander 13*a*, and bypasses the evaporator 14 by the bypass valve 51, thereby producing heating air through the condenser 12.

In addition, in the coolant line 20, since the coolant flows through the radiator heat exchanger 22, the electric device 23, and the dehumidifying heat exchanger 21 in sequence by the switching valve 24, the coolant heated by cooling the electric device 23 is supplied to the dehumidifying heat exchanger 21 so that the dehumidifying heat exchanger 21 performs regeneration by the heat of the coolant.

At this time, a portion of the air circulating through the fourth line 30*d* by the single blower 31A flows to the dehumidifying heat exchanger 21, thereby performing regeneration of the dehumidifying heat exchanger 21, and as the air passes through the dehumidifying heat exchanger 21, the air containing moisture is discharged to the exterior by the third shunt valve 36.

In addition, some air circulating through the fifth line 30*e* flows to the evaporator 14 and the condenser 12 by the fourth shunt valve 37, and passes through the condenser 12 by the temperature control valve 33 to then be discharged to the interior, thereby providing heating air to the interior.

Meanwhile, in the present disclosure, when interior heating is desired in the case where the interior heating load is not high, the interior heating may be performed by collecting the waste heat obtained by cooling the electric device 23, instead of using the heat pump 25 utilizing the refrigerant cycle.

In one form, the heat exchanging line 40 may be configured such that the external air that has passed through the radiator heat exchanger 22 is discharged to the interior or exterior. Accordingly, an air distributor 42 may be further provided in the heat exchanger line, and the air passing through the radiator heat exchanger 22 in the heat exchanging line 40 may be discharged to the interior or exterior through the air distributor 42.

According to this, as shown in FIG. 13, when the temperature required for interior heating is low in the case where heating and dehumidification are desired, the coolant is to flow through the radiator heat exchanger 22, the dehumidifying heat exchanger 21, and the electric device 23 in sequence by the switching valve 24 in the coolant line 20, and the air circulating through the fourth line 30*d* by the single blower 31A passes through the dehumidifying heat exchanger 21 by the third shunt valve 36 and the fourth shunt valve 37 to then be discharged to the interior, and a portion of the external air that has passed through the radiator heat exchanger 22 in the heat exchanging line 40 is discharged to the interior.

That is, the controller may determine whether or not heating can be performed even without operating the refrigerant cycle when heating is desired, thereby identifying whether or not the temperature required for interior heating is low.

Here, the coolant is to flow through the radiator heat exchanger 22, the dehumidifying heat exchanger 21, and the electric device 23 in sequence by the switching valve 24 in the coolant line 20, so that the dehumidifying heat exchanger 21 performs dehumidification. According to this, the air circulating through the fourth line 30*d* by the single blower 31A passes through the dehumidifying heat exchanger 21 by the third shunt valve 36 and the fourth shunt valve 37 and is then discharged to the interior, thereby providing dry air to the interior.

In particular, the radiator heat exchanger 22 performs dehumidification and absorbs external heat to be heated, and as the coolant heated by cooling the electric device 23 circulates, the external air is increased in the temperature thereof by heat exchange when passing through the radiator heat exchanger 22 in the heat exchanging line 40. Accordingly, the heating air produced by passing through the radiator heat exchanger 22 in the heat exchanging line 40 is discharged to the interior by the air distributor 42, thereby providing heating air to the interior.

Meanwhile, as shown in FIG. 14, when the temperature required for interior heating is low in the case where interior heating and regeneration of the dehumidifying heat exchanger 21 are desired, the coolant is to flow through the radiator heat exchanger 22, the electric device 23, and the dehumidifying heat exchanger 21 in sequence by the switching valve 24 in the coolant line 20, and a portion of the air circulating through the fourth line 30*d* by the single blower 31A is discharged to the exterior by the third shunt valve 36, and the remaining air circulating through the fifth line 30*e* is discharged to the exterior by the fourth shunt valve, and a portion of the external air that has passed through the radiator heat exchanger 22 in the heat exchanging line 40 is discharged to the interior.

That is, in the coolant line 20, the coolant flows through the radiator heat exchanger 22, the electric device 23, and the dehumidifying heat exchanger 21 in sequence by the switching valve 24 so that the dehumidifying heat exchanger 21 performs a regeneration operation. In addition, a portion of the air circulating through the fourth line 30*d* by the single blower 31A is discharged to the exterior by the third shunt valve 36, and the remaining air circulating through the fifth line 30*e* is discharged to the exterior or supplied to the interior by the fourth shunt valve.

In particular, because the coolant that causes the dehumidifying heat exchanger 21 to perform regeneration after cooling the electric device 23 passes through the radiator heat exchanger 22, the external air passing through the radiator heat exchanger 22 in the heat exchanging line 40 is increased in the temperature thereof by heat exchange. Accordingly, the heating air produced by passing through the radiator heat exchanger 22 in the heat exchanging line 40 is discharged to the interior by the air distributor 42, thereby providing heating air to the interior.

The air conditioner system for an electric motor vehicle having the structure described above is able to reduce the thermal load on the air conditioner system during air conditioning using a desiccant-coated heat exchanger and to improve energy efficiency using waste heat obtained by cooling the electric device 23 during regeneration of a desiccant-coated heat exchanger.

Although the present disclosure has been illustrated and described with reference to specific embodiments, it should be obvious to those having ordinary skill in the art that the present disclosure can be variously improved and modified without departing from the spirit of the present disclosure.

What is claimed is:

1. An air conditioner system for an electric motor vehicle, the air conditioner system comprising:

a refrigerant line through which a refrigerant circulates and comprising a compressor, a condenser, an expander, and an evaporator;

a coolant line through which a coolant circulates and comprising:

a dehumidifying heat exchanger configured to remove moisture from conditioning air, a radiator heat exchanger, an electric device including a motor, and a switching valve configured to switch a flow direction of the coolant based on whether the dehumidifying heat exchanger performs dehumidification or regeneration, wherein the coolant flowing through the radiator heat exchanger or the coolant flowing through the electric device is directed into the dehumidifying heat exchanger;

an air line configured to cause air to selectively pass through the dehumidifying heat exchanger or the evaporator, and configured to cause the air having passed through at least one of the dehumidifying heat exchanger, the condenser, or the evaporator to be selectively supplied to an interior of the electric motor vehicle, wherein the air line comprises:

a first line comprising a first blower configured to circulate air and extending to an exterior while passing through the dehumidifying heat exchanger;

a second line comprising: a second blower configured to circulate air, and a temperature control valve configured to cause the air to selectively pass through the evaporator or the condenser; and a third line branching from a downstream end of the dehumidifying heat exchanger of the first line through a first shunt valve and connected to an upstream end of the evaporator through a second shunt valve; and a heat exchanging line through which external air circulates, wherein the heat exchanging line comprises an external heat exchanger configured to cause the refrigerant of the refrigerant line to exchange heat with the external air, and is connected to the radiator heat exchanger of the coolant line to cause the external air to exchange heat with the coolant of the coolant line.

2. The air conditioner system of claim 1, wherein the expander in the refrigerant line comprises a first expander disposed at an upstream end of the external heat exchanger and a second expander disposed at a downstream end of the external heat exchanger.

3. The air conditioner system of claim 2, wherein when interior cooling and dehumidification are desired, the first expander is opened and the refrigerant is expanded by the second expander in the refrigerant line, and the coolant flows through the radiator heat exchanger, the dehumidifying heat exchanger, and the electric device in sequence by the switching valve in the coolant line.

4. The air conditioner system of claim 3, wherein the air circulating through the first line flows to the second line by the first shunt valve and the second shunt valve, passes through the evaporator together with the air circulating through the second line, and bypasses the condenser by the temperature control valve to then be discharged to the interior.

5. The air conditioner system of claim 2, wherein when interior cooling and regeneration of the dehumidifying heat exchanger are desired, the first expander is opened and the refrigerant is expanded by the second expander in the refrigerant line, and the coolant flows through the radiator heat exchanger, the electric device, and the dehumidifying heat exchanger in sequence by the switching valve in the coolant line.

6. The air conditioner system of claim 5, wherein the air circulating through the first line is discharged to the exterior by the first shunt valve, and wherein the air circulating through the second line passes through the evaporator by the second shunt valve and bypasses the condenser by the temperature control valve to then be discharged to the interior.

7. The air conditioner system of claim 2, wherein the refrigerant line further comprises a bypass line that branches between the external heat exchanger and the second expander through a bypass valve and is connected between the evaporator and the compressor.

8. The air conditioner system of claim 7, wherein when interior heating and dehumidification are desired, the refrigerant is expanded by the first expander and bypasses the evaporator by the bypass valve in the refrigerant line, and the coolant flows through the radiator heat exchanger, the dehumidifying heat exchanger, and the electric device in sequence by the switching valve in the coolant line.

9. The air conditioner system of claim 8, wherein the air circulating through the first line flows to the second line by the first shunt valve and the second shunt valve and passes through the condenser together with the air circulating through the second line by the temperature control valve to then be discharged to the interior.

10. The air conditioner system of claim 7, wherein when interior heating and regeneration of the dehumidifying heat exchanger are desired, the refrigerant is expanded by the first expander and bypasses the evaporator by the bypass valve in the refrigerant line, and the coolant flows through the radiator heat exchanger, the electric device, and the dehumidifying heat exchanger in sequence by the switching valve in the coolant line.

11. The air conditioner system of claim 10, wherein the air circulating through the first line is discharged to the exterior by the first shunt valve, and wherein the air circulating through the second line passes through the condenser by the second shunt valve and the temperature control valve and is discharged to the interior.

12. The air conditioner system of claim 1, wherein the first line comprises a defrost line that branches from a third shunt valve and extends to a windshield in the interior.

13. The air conditioner system of claim 1, wherein the condenser is configured as a first condenser and a second condenser, wherein the second line comprises a first air conditioning line that passes through the first condenser and extends to a windshield and a second air conditioning line that passes through the second condenser and extends to each interior vent, and wherein the first line comprises a third air conditioning line that branches from a third shunt valve and is connected to the upstream end of the first condenser.

14. The air conditioner system of claim 2, wherein the air line comprises a fourth line that comprises a single blower configured to circulate air, passes through the dehumidifying heat exchanger to be connected to the upstream end of the evaporator, and has a third shunt valve provided at the downstream end of the dehumidifying heat exchanger, and a fifth line that branches from the fourth line through a fourth shunt valve and comprises a temperature control valve configured to cause the air to selectively pass through the evaporator or the condenser.

15. The air conditioner system of claim 14, wherein when interior cooling and dehumidification are desired, the first expander is opened and the refrigerant is expanded by the second expander in the refrigerant line, and the coolant flows through the radiator heat exchanger, the dehumidifying heat exchanger, and the electric device in sequence by the switching valve in the coolant line.

16. The air conditioner system of claim 15, wherein the air circulating through the fourth line by the single blower passes through the dehumidifying heat exchanger by the third shunt valve and the fourth shunt valve, then passes through the evaporator, and bypasses the condenser by the temperature control valve to then be discharged to the interior.

17. The air conditioner system of claim 14, wherein when interior cooling and regeneration of the dehumidifying heat exchanger are desired, the first expander is opened and the refrigerant is expanded by the second expander in the refrigerant line, and the coolant flows through the radiator heat exchanger, the electric device, and the dehumidifying heat exchanger in sequence by the switching valve in the coolant line.

18. The air conditioner system of claim 14, wherein the refrigerant line further comprises a bypass line that branches between the external heat exchanger and the second expander through a bypass valve and is connected between the evaporator and the compressor.

* * * * *